United States Patent
Helfer et al.

(10) Patent No.: US 10,914,387 B2
(45) Date of Patent: Feb. 9, 2021

(54) ROTARY CONTROL VALVE HAVING A CLAMPED VALVE SEAT

(71) Applicant: FISHER CONTROLS INTERNATIONAL LLC, Marshalltown, IA (US)

(72) Inventors: Wade J. Helfer, Ames, IA (US); Robert M. Meloy, Marshalltown, IA (US)

(73) Assignee: FISHER CONTROLS INTERNATIONAL LLC, Marshalltown, IA (US)

( * ) Notice: Subject to any disclaimer, the term of this patent is extended or adjusted under 35 U.S.C. 154(b) by 212 days.

(21) Appl. No.: 15/143,107

(22) Filed: Apr. 29, 2016

(65) Prior Publication Data
US 2017/0307087 A1 Oct. 26, 2017

Related U.S. Application Data

(60) Provisional application No. 62/325,302, filed on Apr. 20, 2016.

(51) Int. Cl.
*F16K 5/06* (2006.01)
(52) U.S. Cl.
CPC .......... *F16K 5/0636* (2013.01); *F16K 5/0642* (2013.01); *F16K 5/0689* (2013.01)
(58) Field of Classification Search
CPC .... F16K 5/0626; F16K 5/0631; F16K 5/0642; F16K 5/0689; F16K 5/0678;
(Continued)

(56) References Cited

U.S. PATENT DOCUMENTS 3,114,386 A * 12/1963 Dumm ................... F16K 5/0678
137/316
3,565,392 A * 2/1971 Bryant ..................... F16K 5/205
251/159

(Continued)

FOREIGN PATENT DOCUMENTS

DE 1017432 B * 10/1957 ........... F16K 5/0673
DE 1185435 B * 1/1965 ........... F16K 5/0626
(Continued)

OTHER PUBLICATIONS

"Fisher Z500 Severe Service Ball Valves," Instruction Manual D103803X012, Mar. 2016.
(Continued)

*Primary Examiner* — Hailey K. Do
(74) *Attorney, Agent, or Firm* — Marshall, Gerstein & Borun LLP

(57) ABSTRACT

A rotary valve is provided for use in highly corrosive and abrasive applications. The valve includes a valve body and an adapter coupled to one end of the valve body, thereby defining an inlet, an outlet, and a valve interior in fluid communication with the inlet and the outlet. The valve also includes a floating ball element pivotably mounted in the valve interior via a valve stem to control fluid flow through the valve, a first valve seat movably disposed in the valve interior, and a second valve seat removably disposed in the valve interior. The first valve seat is biased toward the ball element to sealingly engage a first portion of the ball element. The second valve seat is configured to sealingly engage a second portion of the ball element and is clamped between a surface of the valve body and a surface of the adapter.

19 Claims, 3 Drawing Sheets

(58) Field of Classification Search
CPC ........ F16K 5/0673; F16K 5/201; F16K 5/205; F16K 5/161; F16K 5/168; F16K 5/181; F16K 5/188; F16K 1/2263; F16K 1/2265; F16K 1/2266; F16K 25/005; F16K 5/0668

See application file for complete search history.

(56) References Cited

U.S. PATENT DOCUMENTS

| | | | | |
|---|---|---|---|---|
| 3,598,363 | A * | 8/1971 | Shaw | F16K 5/0642 251/172 |
| 4,519,579 | A * | 5/1985 | Brestel | F16K 1/2263 251/172 |
| 4,645,179 | A * | 2/1987 | Ali | F16K 3/0227 137/329.02 |
| 4,741,509 | A * | 5/1988 | Bunch | F16K 3/0236 251/172 |
| 4,887,794 | A * | 12/1989 | Oliver | F16K 5/0642 251/315.14 |
| 4,911,409 | A | 3/1990 | Oliver et al. | |
| 5,029,812 | A * | 7/1991 | Haynes | F16K 3/0236 251/327 |
| 6,669,171 | B1 * | 12/2003 | Stunkard | F16K 5/0642 251/315.08 |
| 7,306,201 | B2 * | 12/2007 | Lam | F16K 3/0227 251/195 |
| 7,559,531 | B2 * | 7/2009 | Thomas | F16K 5/0642 251/180 |
| 7,850,143 | B1 * | 12/2010 | Rosada | F16K 5/0631 251/121 |
| 9,958,080 | B2 * | 5/2018 | Fan | F16K 5/0689 |
| 2011/0260088 | A1 * | 10/2011 | Cunningham | F16K 5/0642 251/315.01 |
| 2014/0239212 | A1 * | 8/2014 | Haland | F16K 5/0678 251/181 |
| 2016/0102769 | A1 | 4/2016 | Anderson et al. | |

FOREIGN PATENT DOCUMENTS

| | | | | |
|---|---|---|---|---|
| DE | 1209382 B | * | 1/1966 | ........... F16K 5/0673 |
| DE | 10058530 A1 | * | 5/2002 | ........... F16K 5/0642 |
| GB | 1032823 A | * | 6/1966 | ............ F16K 5/204 |
| GB | 2033551 A | * | 5/1980 | ........... F16K 5/0642 |
| JP | 2009041776 A | | 2/2009 | |
| WO | WO 8804380 A1 | * | 6/1988 | ........... F16K 5/0678 |

OTHER PUBLICATIONS

"Case Studies: Metal Seated Ball Valve Solutions for the Autoclave Industry," MOGAS Industries Inc., 2007.

"TBV Series 3300 Secured, Metal-Seated Ball Valves," Cameron, 2015.

"Metal-Seated Ball Valves," Velan, 2015.

"Valves for Autoclave Processes, Engineered Solutions for the Mining & Minerals Industry," MOGAS Industries, Inc., 2012.

Oudenaren et al., "Developments in the Specification, Design, Manufacture, and Quality Control of Titanium Metal-Seated Ball Valves for HPAL and POX Plant Applications," Titanium 2010 Conference International Titanium Association, Orlando, pp. 1-34, Oct. 2010.

Oudenaren et al., "Titanium Metal-Seated Ball Valves for HPAL and POx," presented at Titanium 2010 Conference, Oct. 2010.

International Search Report and Written Opinion for PCT/US2017/024020, dated Jun. 29, 2017.

* cited by examiner

ROTARY CONTROL VALVE HAVING A CLAMPED VALVE SEAT

FIELD OF THE DISCLOSURE

The disclosure generally relates to rotary control valves and more specifically to a rotary control valve having a clamped valve seat that is securely retained but can be easily and quickly removed and replaced.

BACKGROUND OF THE DISCLOSURE

Process control systems often employ rotary valves, such as ball valves, butterfly valves, eccentric-disk valves, eccentric-plug valves, etc., to control the flow of process fluids. Rotary valves typically include a valve trim assembly having a seat disposed in the fluid path and surrounding a flow aperture, and a fluid control element (e.g., a disk, a ball, etc.) disposed in the fluid path and rotatably coupled to the body of the valve via a shaft. To control the flow of fluid through some rotary valves, the position of the fluid control element may be varied from a closed position at which the fluid control element is in sealing engagement with the seat, thereby preventing fluid flow through the flow aperture, to a fully open or maximum flow rate position at which the fluid control element is spaced away from the seat, thereby allowing fluid flow through the flow aperture.

In some cases, a rotary valve may be employed in highly corrosive and abrasive applications, such as for example pressure oxidation (PDX), and high pressure acid leach (HPAL) autoclave applications. Such applications, which are, for example, utilized in the mining industry to extract precious metals from iron ore, involve the use of mixtures that are corrosive and include particles such as minerals that erode or otherwise damage components of the rotary valve. As an example, the slurry mixture that is present in PDX and HPAL autoclave applications contains injected steam, injected oxygen (for PDX applications) or acid (for HPAL applications), sulfuric acid, and various minerals. Thus, when a rotary valve is employed in such applications, the components of the rotary valve, e.g., the fluid control element and the seat, are typically made of titanium or another high-strength and corrosion-resistant metal. Although this extends the lifespan of the various components, frequent maintenance is still required. As an example, a titanium valve seat may need to be replaced every 3 to 6 months, while the rotary valve itself may need to be replaced after 1 to 2 years in service.

Given the expense involved in performing frequent maintenance, various attempts have been made to provide a rotary valve that is easy to maintain. One such known rotary valve includes a titanium valve seat that is removably attached to a titanium valve body via titanium fasteners, such that the valve seat can be quickly and easily removed and replaced. However, because contact or adhesion between titanium surfaces, which happens when the titanium fasteners contact or rub against various surfaces of the titanium valve body, tends to lead to galling, or wear, in the rotary valve, this known rotary valve creates an additional set of maintenance challenges.

SUMMARY

In accordance with a first exemplary aspect, a rotary valve includes a valve body and an adapter coupled to one end of the valve body, thereby defining an inlet, an outlet, and a valve interior in fluid communication with the inlet and the outlet. The valve also includes a floating ball element pivotably mounted in the valve interior via a valve stem to control fluid flow through the valve, a first valve seat movably disposed in the valve interior proximate to the inlet, and a second valve seat removably disposed in the valve interior proximate to the outlet. The first valve seat is biased toward the ball element to sealingly engage a first portion of the ball element. The second valve seat is configured to sealingly engage a second portion of the ball element and is clamped between a surface of the valve body and a surface of the adapter.

In accordance with a second exemplary aspect, a rotary valve includes a valve body and an adapter coupled to one end of the valve body, thereby defining an inlet, an outlet, and a valve interior in fluid communication with the inlet and the outlet. The valve also includes a floating ball element pivotably mounted in the valve interior via a valve stem to control fluid flow through the valve, a first valve seat movably disposed in the valve interior proximate to the inlet, and a second valve seat removably disposed in the valve interior proximate to the outlet. The first valve seat is biased toward the ball element to sealingly engage a first portion of the ball element. The second valve seat is configured to sealingly engage a second portion of the ball element, and the valve body and the adapter are arranged to removably retain the second valve seat in the valve interior without using any fasteners.

In accordance with a third exemplary aspect, a rotary valve includes a valve body and an adapter coupled to one end of the valve body, thereby defining an inlet, an outlet, and a valve interior in fluid communication with the inlet and the outlet. The valve also includes a floating ball element pivotably mounted in the valve interior via a valve stem to control fluid flow through the valve, a first valve seat movably disposed in the valve interior proximate to the inlet, and a second valve seat removably disposed in the valve interior proximate to the outlet. The first valve seat is biased toward the ball element to sealingly engage a first portion of the ball element. The second valve seat is configured to sealingly engage a second portion of the ball element, and is retained between a surface of the valve body and a surface of the adapter. The rotary valve further includes a first sealing element arranged within a first recess of the second valve seat to prevent fluid flow through a first secondary leak path existing between the second valve seat and the surface of the adapter.

In further accordance with any one or more of the foregoing first, second, or third exemplary aspects, a rotary valve may include any one or more of the following further preferred forms.

In one preferred form, the valve body includes a shoulder arranged to receive an outer perimeter edge of the second valve seat to clamp the second valve seat.

In another preferred form, the rotary valve also includes a biasing element configured to bias the first valve seat toward the ball element. The biasing element is arranged between the valve inlet and the first valve seat.

In another preferred form, the biasing element is arranged immediately adjacent a counter bore formed in the valve body.

In another preferred form, the second valve seat has a substantially annular body and a skirt extending outwardly from the substantially annular body. The skirt is arranged within a recess formed in the adapter.

In another preferred form, the skirt includes an inner perimeter edge and an outer perimeter edge spaced from the inner perimeter edge, the inner perimeter edge including the skirt.

In another preferred form, the rotary valve further includes a first sealing element arranged within a first recess of the second valve seat to prevent fluid flow through a first secondary leak path existing between the second valve seat and the surface of the adapter.

In another preferred form, the rotary valve further includes a second sealing element arranged within a second recess of the second valve seat to prevent fluid flow through a second secondary leak path existing between the second valve seat and the surface of the valve body, the second recess located at a position that is radially outward of a location of the first recess.

In another preferred form, the rotary valve further includes a spiral wound gasket arranged between the valve body and the adapter to prevent leakage to atmosphere.

In another preferred form, the valve body includes a shoulder arranged to receive an outer perimeter edge of the second valve seat to removably retain the second valve seat in the valve interior.

BRIEF DESCRIPTION OF THE DRAWINGS

The features of this invention which are believed to be novel are set forth with particularity in the appended claims. The invention may be best understood by reference to the following description taken in conjunction with the accompanying drawings, in which like reference numerals identify like elements in the several FIGS., in which:

DETAILED DESCRIPTION

The present disclosure is directed to a rotary control valve that includes a valve seat that is clamped in position, such that the valve seat is securely retained in position without the need to resort to fasteners, thereby preventing the undesirable galling discussed above. At the same time, the valve seat can be quickly and easily removed and replaced (or repaired) when maintenance is needed. In some cases, the valve seat can also include one or more face seals that are configured to shut off or close secondary leak paths regardless of flow direction in the rotary control valve.

Figure 1:
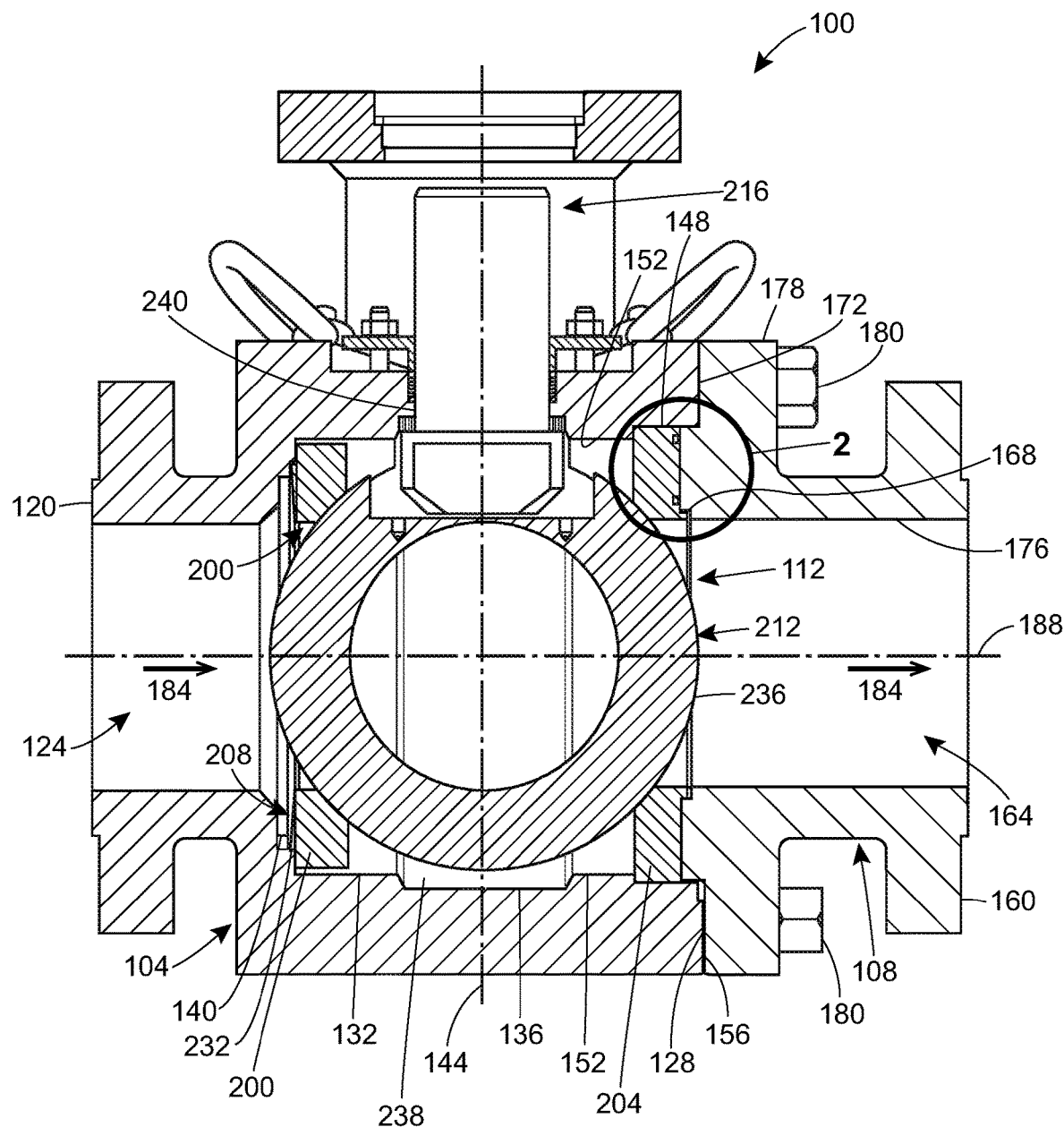
FIG. 1 is a cross-sectional view of a first example of a rotary control valve constructed in accordance with the teachings of the present invention.
Figure 2:
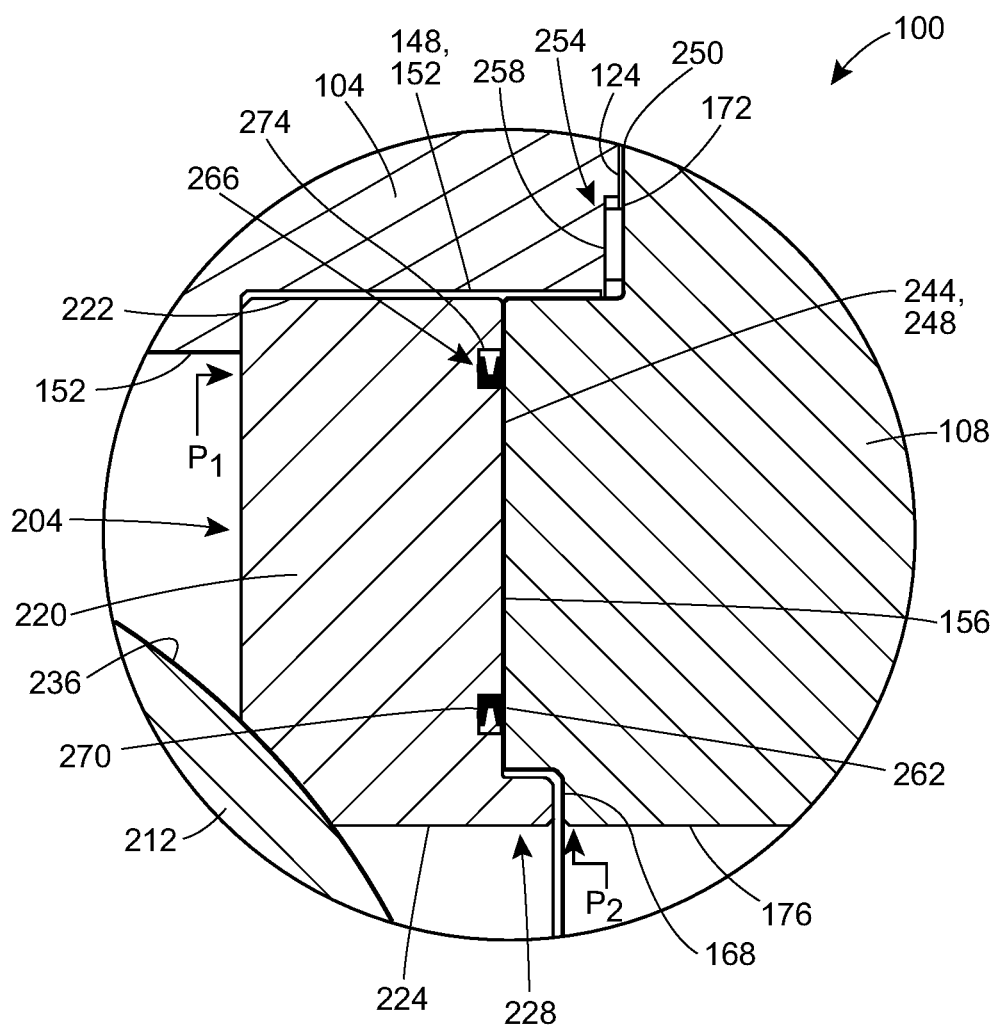
FIG. 2 is an enlarged, partial cross-sectional view of a portion of the rotary control valve of FIG. 1, illustrating a valve seat clamped between a valve body and an end adapter of the rotary control valve.

FIGS. 1 and 2 illustrate one example of a rotary control valve 100 constructed in accordance with the principles of the present invention. The rotary control valve 100 is made or manufactured from or using titanium or another suitable high-strength and corrosion-resistant metal, such that the rotary control valve 100 can be used in highly corrosive and abrasive applications, e.g., the PDX and HPAL autoclave applications discussed above, at relatively low temperatures (e.g., 400-500 degrees Fahrenheit). Of course, if desired, the rotary control valve 100 can be made from or using different materials and/or can be utilized in other applications (e.g., less corrosive and abrasive applications) and/or at lower or higher temperatures (e.g., temperatures above 400-500 degrees Fahrenheit).

With reference to FIG. 1, the rotary control valve 100 generally includes a valve body 104, an end adapter 108 removably coupled to one end of the valve body 104, and a valve trim assembly 112 coupled to the valve body 104 and the end adapter 108. The valve body 104 is generally cylindrical and has a first end 120 that defines a fluid inlet 124 of the valve 100, a second end 128 disposed opposite the first end 120, and an interior or opening 132 arranged between the fluid inlet 124 and the second end 128. The interior or opening 132 is sized to receive components of the valve trim assembly 112, as will be described in greater detail below. The valve body 104 also includes a pair of counter bores—a first counter bore 136 and a second counter bore 140. The first counter bore 136 is centrally formed about a longitudinal axis 144 of the valve 100 and serves to create a space within the valve 100 that can accommodate a limited amount of particle build up without affecting operation of the valve 100. The second counter bore 140 is also arranged within the interior 132 of the valve body 104, but at a position more proximate to the first end 120 (and a position proximate to the fluid inlet 124). A shoulder 148 is formed along an inner radial surface 152 of the valve body 104 within the interior 132 at a position proximate to the second end 128 (and generally at a position within the interior 132 opposite the second counter bore 140). Further details regarding the first counter bore 136, the second counter bore 140, and the shoulder 148 will be described below.

The end adapter 108 is also generally cylindrical and has a first end 156 and a second end 160 that is disposed opposite the first end 156 and defines a fluid outlet 164 of the valve 100. The end adapter 108 includes a circumferential recess 168 and an annular shoulder 172. The recess 168 is formed at or proximate to the second end 160 along a radially inward surface 176 of the end adapter 108. The annular shoulder 172 is similarly formed or defined at or proximate to the second end 160, but is formed or defined at a position that is radially outward of the recess 168. The annular shoulder 172 terminates at a radially outward surface 178 of the end adapter 108.

The end adapter 108 is, as illustrated in FIG. 1, removably coupled to the valve body 104 by removably coupling the first end 156 of the end adapter 108 to the second end 128 of the valve body 104 in any suitable manner, e.g., via a plurality of fasteners 180. When the valve body 104 and the end adapter 108 are so coupled, the valve 100 defines a fluid flow passageway 184 between the fluid inlet 124 (defined by the valve body 104) and the fluid outlet 164 (defined by the end adapter 108). The fluid flow passageway 184 is oriented along an axis 188 that is substantially perpendicular to the longitudinal axis 144.

With reference to FIGS. 1 and 2, the trim assembly 112 includes a first valve seat 200, a second valve seat 204, a biasing element 208, a closure member 212, and a stem or shaft 216. The first valve seat 200, which in this example takes the form of an annular seat ring, is movably disposed (e.g., floats) in the fluid flow passageway 184 proximate the fluid inlet 124, and, more particularly, immediately adjacent the second counter bore 140. The second valve seat 204 is, like the first valve seat 200, disposed in the fluid flow passageway 184, but is disposed downstream of the first valve seat 200 at a position proximate the fluid outlet 164, and, more particularly, against the first end 156 of the end adapter 108. As will be described in greater detail below, the second valve seat 204 is removably clamped or retained in this position without using any fasteners. The second valve seat 204 has a substantially annular body 220 having an outer perimeter edge 222 and an inner perimeter edge 224. The second valve seat 204 also includes a skirt 228 that extends outward from the substantially annular body 220 at or along the inner perimeter edge 224.

As illustrated in FIG. 1, the biasing element 208, which in this example takes the form of a Belleville spring, is arranged in an opening 232 between the second counter bore 140 and the first valve seat 200. So arranged, the biasing element 208 biases the first valve seat 200 toward and into engagement with the closure member 212. The closure member 212 is disposed within the fluid flow passageway 184 and is illustrated as a floating ball element having a peripheral edge 236 that sealingly engages both the first valve seat 200 and the second valve seat 204 to prevent the flow of fluid (e.g., slurry) through the valve 100. As illustrated in FIG. 1, the first counter bore 136 is formed so as to create a space 238 between the peripheral edge 236 of the closure member 212 and the inner radial surface 152 of the valve body 104. Thus, when the valve 100 is in operation, the valve 100 can, via the space 238, accommodate or tolerate a limited amount of particle build up (i.e., particles can be packed in) without affecting the operation of the valve 100.

The stem or shaft 216 is disposed in an opening 240 of the valve body 104 and partially disposed in the interior 132 along the longitudinal axis 144. The stem or shaft 216 is coupled to one end of the closure member 212, which can be accomplished in any known manner. When the closure member 212 is coupled to the shaft 216, the shaft 216 can move (e.g., rotate) the closure member 212 between a closed position, shown in FIG. 1, in which the peripheral edge 236 of the closure member 212 sealingly engages both the first valve seat 200 and the second valve seat 204 to close the valve 100 (and prevent fluid flow therethrough), and an open position, not shown, in which the peripheral edge 236 of the closure member 212 is spaced from the first valve seat 200 and the second valve seat 204 to permit fluid flow through the valve 100 (particularly the fluid flow passageway 184).

While not described or illustrated herein, it will be appreciated that the valve 100 can include additional components. An actuator, such as a mechanical actuator (e.g., a handle), a pneumatic actuator, a hydraulic actuator, an electric actuator, or any other suitable actuator, can be operatively coupled to the shaft 216 to drive (e.g., rotate) the closure member 212 between the closed position and the open position to control the flow of fluid through the valve 100. The valve 100 can also include a packing set that is disposed in the opening 240 of the valve body 104 to prevent fluid leakage. The packing set can be retained in the desired position with a packing gland, packing stud, one or more washers (e.g., Belleville washers), other components, or combinations thereof, and, as is known in the art, such components can be adjusted to alter the force imparted on the packing set, thereby altering the seal between the packing set and the shaft 216. The valve 100 can also include other components, e.g., a thrust bushing and a bracket (e.g., for coupling the packing set and other components to the valve body 104).

With reference back to FIG. 2, the second valve seat 204 is removably clamped between a surface of the valve body 104 and a surface of the end adapter 108, such that the second valve seat 204 is secured in the desired position by the profiles of the valve body 104 and the end adapter 108 without having to use fasteners, which as noted above, undesirably leads to galling. As a result, the second valve seat 204 can be easily and quickly removed and replaced by decoupling the end adapter 108 from the valve body 104.

In the illustrated example, the second valve seat 204 is removably clamped between the inner radial surface 152 of the valve body 104 and the first end 156 of the end adapter 108. More specifically, the outer perimeter edge 222 of the annular body 220 of the second valve seat 204 is seated substantially against or in contact with the shoulder 148 of the valve body 104, an outer face 244 of the annular body 220 is seated substantially against or in contact with an inwardly extending face 248 of the end adapter 108, and the skirt 228 is seated or arranged in the circumferential recess 168 of the end adapter 108. In other examples, the second valve seat 204 can be removably clamped between different surfaces of the valve body 104 and/or the end adapter 108, e.g., when the valve body 104 and/or the end adapter 108 have different profiles. In any event, when the second valve seat 204 is removably clamped between the valve body 104 and the end adapter 108, the second valve seat 204 is securely retained between the closure member 212 and the end adapter 108, but, at the same time, the second valve seat 204 can be quickly and easily removed and replaced when desired.

As is also illustrated in FIG. 2, when the valve body 104 and the end adapter 108 are coupled to one another, a small gap 250 may be formed between the second end 128 of the valve body 104 and the shoulder 172 of the end adapter 108. Thus, to prevent fluid from leaking out of the valve 100, and leaking to atmosphere, via this gap 250, a sealing element 254, which in this example takes the form of a spiral wound gasket, can be disposed between the second end 128 of the valve body 104 and the shoulder 172 of the end adapter 108. In the illustrated example, the sealing element 254 is at least partially disposed in a recessed portion 258 of the second end 128, though in other examples, that need not be the case. In any event, when the sealing element 254 is arranged between the second end 128 of the valve body 104 and the shoulder 172 of the end adapter 108, the sealing element 254 substantially prevents fluid from escaping out of the valve 100 via the gap 250.

In some cases, and as illustrated in FIG. 2, the rotary control valve 100 also includes a pair of sealing elements—a first sealing element 262 and a second sealing element 266—each arranged in the second valve seat 204 to prevent or eliminate secondary leak paths from occurring or forming. The first and second sealing elements 262, 266 are, in this example, made of or from a material, such as titanium, Teflon, graphite, or various plastics, suitable for withstanding corrosive and abrasive fluid (e.g., sulfuric acid) flowing through the valve 100 at various temperatures (e.g., temperatures between 400 and 500 degrees Fahrenheit, temperatures above 500 degrees Fahrenheit, etc.).

The first and second sealing elements 262, 266 illustrated in FIG. 2 are substantially U-shaped in cross-section, though the elements 262, 266 can have a circular, oval, square, rectangular, or other shape in cross-section. The first sealing element 262 is arranged or seated within a first recess 270 formed in the second valve seat 204. The first sealing element 262 is thus arranged to prevent or eliminate a first secondary leak path that might otherwise exist between the outer face 244 of the second valve seat 204 and the inner face 248 of the adapter 108. The second sealing element 266 is arranged or seated within a second recess 274 that is, like the first recess 270, formed in the second valve seat 204, but is formed in the second valve seat 204 at a position that is radially outward of the position of the first recess 270. The second sealing element 266 is thus arranged to prevent or eliminate a second secondary leak path that might otherwise exist between the outer perimeter edge 222 of the second valve seat 204 and the inner radial surface 152 of the valve body 204.

In operation, the actuator (not shown) drives the closure member 212 between the open position (not shown) and the closed position illustrated in FIG. 1. In the open position, which is not shown, fluid can flow through the fluid flow passageway 184 of the valve 100. The second counter bore 140 is positioned to help facilitate fluid flow by flushing out any particles (e.g., minerals) that would otherwise become lodged or collected between the valve body 104 and the biasing element 208. Additionally, the first and second sealing elements 262, 266 are protected from flowing process fluid by the skirt 228, which extends outwardly from the annular body 220 of the second valve seat 204 (and outwardly of the first and second sealing elements 262, 266) and is arranged in the recess 168 of the end adapter 108. In the closed position, the closure member 212 engages the first valve seat 200 (which is biased toward and into engagement with the closure member 212 via the biasing element 208) and the second valve seat 204 to effect a seal and provide a shutoff (i.e., prevent the flow of fluid through the fluid flow passageway 184 of the valve 100).

In some cases, it may be desirable that the valve 100 have bi-directional shut off capabilities. In these cases, and in instances where pressure originates downstream of the clamped valve seat 204, thereby causing the closure member 212 to float away from, and out of contact with, the valve seat 204, the first and second sealing elements 262, 266 not only prevent or eliminate secondary leak paths (this occurs regardless of flow direction), but also help to keep the clamped valve seat 204 loaded or biased against the end adapter 104. More specifically, the first and second sealing elements 262, 266 are spaced such that a pressure P1 and a pressure P2 (see FIG. 2) produce a force unbalance that keeps the clamped valve seat 204 loaded or biased against the end adapter 104. Nevertheless, even if a gap does exist or form between the valve seat 204 and the valve body 104 and/or the end adapter 108, the first and second sealing elements 262, 266 also serve to prevent particles (e.g., minerals) from collecting between the valve seat 204 and the valve body 104 (in the case of the second sealing element 266) or the end adapter 108 (in the case of the first sealing element 262). In turn, the first and second sealing elements 262, 266 help to ensure that should a gap be present (e.g., because the valve seat 204 temporarily shifts away from the valve body 104 and/or the end adapter 108), the seat 204 can return to its desired location, i.e., in contact with the valve body 104 and the end adapter 108, at the desired point in time.

It will be appreciated that the valve 100 can vary from the rotary valve 100 illustrated in FIG. 1. The shape, size, and/or construction of the valve body 104 and/or the end adapter 108 can vary. As an example, the valve body 104 need not include the first and/or second counter bores 136, 140. The shape, size, and/or construction of any components of the trim assembly 112 can vary. In some cases, the shape and/or size of the second valve seat 204 can vary. For example, the second valve seat 204 need not include the skirt 228 (in which case the second valve seat 204 would have a substantially annular shape like the first valve seat 200). In some cases, the shape and/or size of the closure member 212 can vary as well. As an example, while the closure member 212 is illustrated as being a ball, the closure member 212 can, in other implementations, be a disk or any other suitable closure member.

Figure 3:
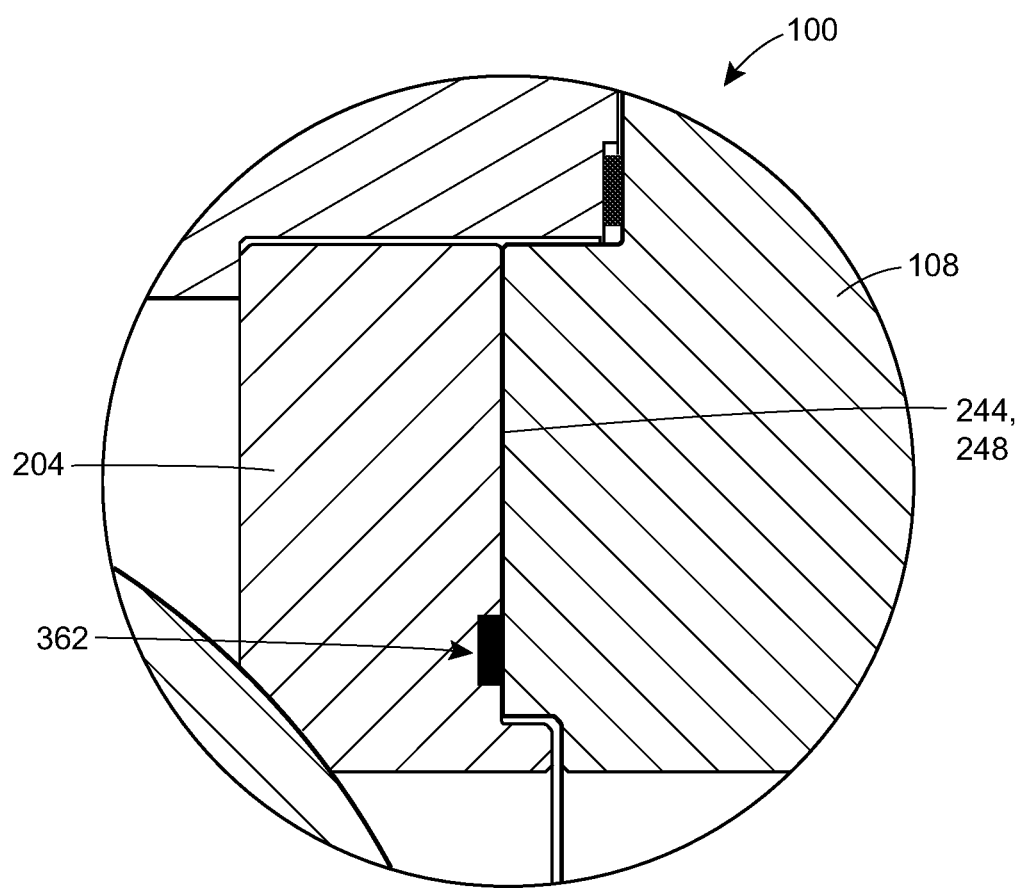
FIG. 3 is an enlarged, partial cross-sectional view similar to FIG. 2, but of a second example of a rotary control valve constructed in accordance with the teachings of the present invention.

Moreover, while FIG. 2 illustrates the rotary control valve 100 as including both the first sealing element 262 and the second sealing element 266, the rotary control valve 100 can alternatively include more or less sealing elements. As illustrated in FIG. 3, for example, the rotary control valve 100 may only include one sealing element—in this case, a first sealing element 362. The first sealing element 362 is arranged in the valve seat 204 in or at a similar location as the first sealing element 262, and thus, as described above, the first sealing element 362 is configured to prevent or eliminate a first secondary leak path that might otherwise exist between the outer face 244 of the second valve seat 204 and the inner face 248 of the adapter 108. The first sealing element 362 is also configured to prevent particles from collecting between the valve seat 204 and the end adapter 108, should any gaps be present. It will, however, be appreciated that because the valve 100 illustrated in FIG. 3 only includes the first sealing element 362, and not a second sealing element, the valve 100 of FIG. 3 does not have the pressure unbalance feature described above, which serves to load or bias the valve seat 204 against the end adapter 108.

Although certain rotary valves have been described herein in accordance with the teachings of the present disclosure, the scope of coverage of this patent is not limited thereto. On the contrary, while the invention has been shown and described in connection with various preferred embodiments, it is apparent that certain changes and modifications, in addition to those mentioned above, may be made. This patent covers all embodiments of the teachings of the disclosure that fairly fall within the scope of permissible equivalents. Accordingly, it is the intention to protect all variations and modifications that may occur to one of ordinary skill in the art.

The invention claimed is:

1. A rotary valve, comprising:
    a valve body and an adapter coupled to one end of the valve body, thereby defining a valve inlet, a valve outlet, and a valve interior in fluid communication with the valve inlet and the valve outlet;
    a floating ball element pivotably mounted in the valve interior via a valve stem to control fluid flow between the valve inlet and the valve outlet;
    a first valve seat movably disposed in the valve interior proximate to the valve inlet;
    a biasing element arranged within the valve body to bias the first valve seat toward the ball element to sealingly engage a first portion of the ball element, the biasing element comprising a spring having a first end seated against the valve body and a second end, opposite the first end, seated against the first valve seat;
    a second valve seat removably disposed in the valve interior proximate to the valve outlet and configured to sealingly engage a second portion of the ball element, wherein the second valve seat is clamped between a surface of the valve body and a surface of the adapter, wherein the second valve seat is spaced from the first valve seat, wherein the adapter comprises a recess and an annular shoulder defined at a position radially outward of the recess, and wherein the second valve seat comprises a substantially annular body and a skirt extending outwardly from the substantially annular body, the substantially annular body having a surface that engages the valve body, and the skirt arranged within the recess formed in the adapter;
    a gap formed between the one end of the valve body and the annular shoulder of the adapter; and a sealing element arranged between the valve body and the adapter to prevent leakage to atmosphere via the gap.

2. The rotary valve of claim 1, wherein the valve body comprises a shoulder arranged to receive an outer perimeter edge of the second valve seat to clamp the second valve seat.

3. The rotary valve of claim 1, wherein the biasing element is arranged immediately adjacent a counter bore formed in the valve body.

4. The rotary valve of claim 1, wherein the second valve seat includes an inner perimeter edge and an outer perimeter edge spaced from the inner perimeter edge, the inner perimeter edge including the skirt.

5. The rotary valve of claim 1, further comprising a fluid flow passageway defined between the fluid inlet and the fluid outlet, the biasing element at least partially disposed within the fluid flow passageway.

6. The rotary valve of claim 1, wherein the first valve seat is an annular seat ring.

7. The rotary valve of claim 1, wherein the valve stem is disposed in an opening of the valve body and partially disposed in the valve interior.

8. The rotary valve of claim 1, further comprising a first sealing element arranged within a first recess of the second valve seat to prevent fluid flow through a first secondary leak path existing in the rotary valve.

9. The rotary valve of claim 8, further comprising a second sealing element arranged within a second recess of the second valve seat to prevent fluid flow through a second secondary leak path existing in the rotary valve, the second recess located at a position that is radially outward of a location of the first recess, such that the second sealing element is spaced from the first sealing element.

10. A rotary valve, comprising:
a valve body and an adapter coupled to one end of the valve body, thereby defining a valve inlet, a valve outlet, and a valve interior in fluid communication with the valve inlet and the valve outlet;
a floating ball element pivotably mounted in the valve interior via a valve stem to control fluid flow between the valve inlet and the valve outlet;
a first valve seat movably disposed in the valve interior proximate to the valve inlet;
a biasing element arranged within the valve body to bias the first valve seat toward the ball element to directly and sealingly engage a first portion of the ball element, the biasing element comprising a spring having a first end seated against the valve body and a second end, opposite the first end, seated against the first valve seat;
a second valve seat disposed in the valve interior proximate to the valve outlet and configured to directly and sealingly engage a second portion of the ball element, wherein the valve body and the adapter are arranged to removably retain the second valve seat in the valve interior without using any fasteners, wherein the second valve seat is spaced from the first valve seat, wherein the adapter comprises a recess and an annular shoulder defined at a position radially outward of the recess, and wherein the second valve seat comprises a substantially annular body and a skirt extending outwardly from the substantially annular body, the substantially annular body having a surface that engages the valve body, and the skirt arranged within the recess formed in the adapter;
a gap formed between the one end of the valve body and the annular shoulder of the adapter; and
a sealing element arranged between the valve body and the adapter to prevent leakage to atmosphere via the gap.

11. The rotary valve of claim 10, wherein the valve body comprises a shoulder arranged to receive an outer perimeter edge of the second valve seat to securely and removably retain the second valve seat in the valve interior.

12. The rotary valve of claim 10, wherein the biasing element is arranged immediately adjacent a counter bore formed in the valve body.

13. The rotary valve of claim 10, further comprising:
a first sealing element arranged within a first recess of the second valve seat to prevent fluid flow through a first secondary leak path existing in the rotary valve; and
a second sealing element arranged within a second recess of the second valve seat to prevent fluid flow through a second secondary leak path existing in the rotary valve, the second recess located at a position that is radially outward of a location of the first recess, such that the second sealing element is spaced from the first sealing element.

14. The rotary valve of claim 13, wherein the second recess is axially aligned with the first recess between the valve inlet and the valve outlet.

15. A rotary valve, comprising:
a valve body and an adapter coupled to one end of the valve body, thereby defining a valve inlet, a valve outlet, and a valve interior in fluid communication with the valve inlet and the valve outlet;
a valve stem partially disposed in the valve interior and extending along a longitudinal axis of the rotary valve;
a floating ball element pivotably mounted in the valve interior via the valve stem to control fluid flow between the valve inlet and the valve outlet;
a first valve seat movably disposed in the valve interior proximate to the valve inlet;
a biasing element arranged within the valve body to bias the first valve seat toward the ball element to sealingly engage a first portion of the ball element, the biasing element having a first end seated against the valve body and a second end, opposite the first end, seated against the first valve seat;
a second valve seat disposed in the valve interior proximate to the valve outlet and configured to sealingly engage a second portion of the ball element, wherein the second valve seat is retained between a surface of the valve body and a surface of the adapter, and wherein the second valve seat has a surface that engages the valve body;
a first sealing element arranged within a first recess of the second valve seat to prevent fluid flow through a first secondary leak path existing in the rotary valve;
a second sealing element arranged within a second recess of the second valve seat to prevent fluid flow through a second secondary leak path existing in the rotary valve, the second recess located at a position that is radially outward of a location of the first recess, such that the second sealing element is spaced from the first sealing element, wherein the second recess is axially aligned with the first recess between the valve inlet and the valve outlet along a direction that is parallel to the longitudinal axis;
a gap formed between the one end of the valve body and an annular shoulder of the adapter; and
a third sealing element arranged between the valve body and the adapter to prevent leakage to atmosphere via the gap.

16. The rotary valve of claim 15, wherein the valve body comprises a shoulder sized to receive an outer perimeter edge of the second valve seat to retain the second valve seat.

17. The rotary valve of claim 15, wherein the second valve seat comprises a substantially annular body and a skirt extending outwardly from the substantially annular body, the skirt arranged within a recess formed in the adapter.

18. The rotary valve of claim 17, wherein the second valve seat includes an inner perimeter edge and an outer perimeter edge spaced from the inner perimeter edge, the inner perimeter edge including the skirt.

19. The rotary valve of claim 17, wherein each of the first recess and the second recess is disposed within the substantially annular body of the second valve seat.

\* \* \* \* \*

UNITED STATES PATENT AND TRADEMARK OFFICE
CERTIFICATE OF CORRECTION

PATENT NO. : 10,914,387 B2
APPLICATION NO. : 15/143107
DATED : February 9, 2021
INVENTOR(S) : Wade J. Helfer et al.

Page 1 of 1

It is certified that error appears in the above-identified patent and that said Letters Patent is hereby corrected as shown below:

In the Specification

At Column 1, Line 30, "(PDX)," should be -- (POX), --.

At Column 1, Line 36, "PDX" should be -- POX --.

At Column 1, Line 38, "PDX" should be -- POX --.

At Column 3, Line 63, "PDX" should be -- POX --.

Signed and Sealed this
Seventh Day of September, 2021

Drew Hirshfeld
*Performing the Functions and Duties of the
Under Secretary of Commerce for Intellectual Property and
Director of the United States Patent and Trademark Office*